No. 668,675. Patented Feb. 26, 1901.
J. CARLSON.
CLUTCH.
(Application filed Nov. 14, 1900.)
(No Model.)
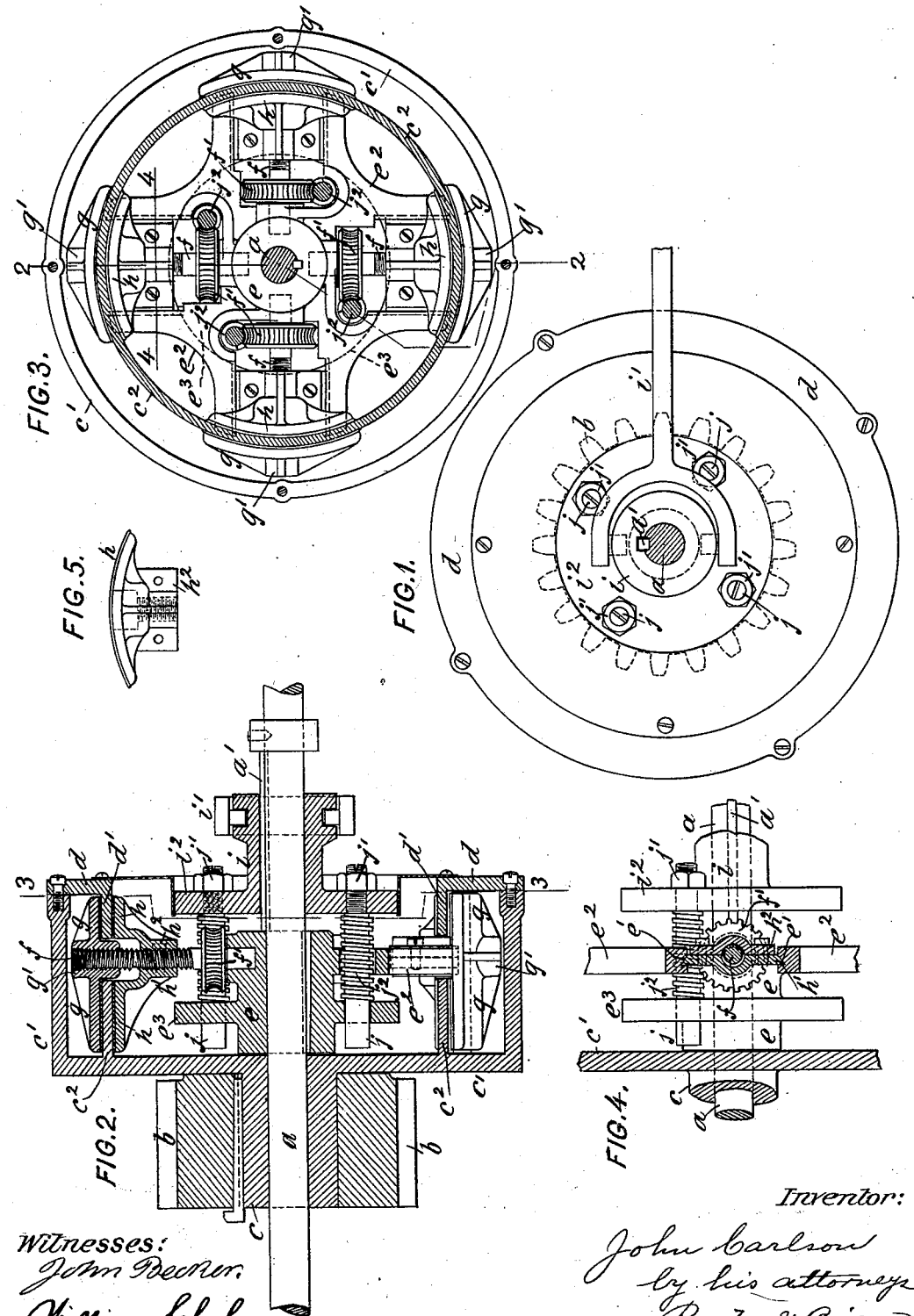
Witnesses:
John Becker.
William Schulz.
Inventor:
John Carlson
by his attorneys
Roeder & Briesen

UNITED STATES PATENT OFFICE.

JOHN CARLSON, OF BROOKLYN, NEW YORK.

CLUTCH.

SPECIFICATION forming part of Letters Patent No. 668,675, dated February 26, 1901.

Application filed November 14, 1900. Serial No. 36,430. (No model.)

*To all whom it may concern:*

Be it known that I, JOHN CARLSON, a citizen of the United States, and a resident of Brooklyn, county of Kings, and State of New York, have invented certain new and useful Improvements in Clutches, of which the following is a specification.

This invention relates to a clutch of simple construction and adapted to quickly and effectively couple a transmission-wheel to a shaft.

In the accompanying drawings, Figure 1 is an end view of my improved clutch; Fig. 2, a section on line 2 2, Fig. 3; Fig. 3, a section on line 3 3, Fig. 2; Fig. 4, a section on line 4 4, Fig. 3, looking down; and Fig. 5, a detail of one of the hub-sections $h^2$.

The letter $a$ represents a shaft, and $b$ the gear or transmission wheel, which is to be coupled to said shaft or uncoupled therefrom by means of the clutch. This wheel is keyed to or made integral with a hub $c$, that loosely surrounds shaft $a$, and is provided with an extension or casing $c'$, having a circular flange $c^2$, concentric to shaft $a$. To obtain a better gripping-surface, I prefer to form a second circular flange $d'$ upon an annular disk $d$, secured to the edge of casing $c'$, the flanges $c^2$ $d'$ being arranged at equal radial distances from shaft $a$ and facing each other.

Within the casing $c'$ there is keyed to shaft $a$ a collar $e$, in which are stepped the inner ends of four (more or less) radially-arranged right-and-left screws $f$. The outer thread of each screw engages the threaded hub $g'$ of an outer jaw $g$, adapted to engage the outer faces of the flanges $c^2$ $d'$. The inner thread of each screw engages the split and threaded hub $h'$ $h^2$ of an inner jaw $h$, adapted to engage the inner faces of the flanges $c^2$ $d'$. The edge of hub-section $h'$ projects laterally beyond that of the section $h^2$, Fig. 4, and is guided within a groove $e'$ of a spider $e^2$, formed integral with collar $e$. It will be seen that by simultaneously turning the screws $f$ the jaws $g$ $h$ will either engage or release the flanges $c^2$ $d'$, so that thus the hub $c$, and consequently the wheel $b$, is coupled to or uncoupled from the shaft $a$.

In order to operate the screws $f$, I provide a sliding sleeve $i$, that embraces the shaft $a$ and is guided thereon by a groove and a feather $a'$. A clutch-lever $i'$ serves to move this sleeve either toward or away from the collar $e$. A flange $i^2$ of sleeve $i$ is provided with as many tapped perforations as there are screws $f$, and each one of these perforations receives the threaded end of a screw $j$, carrying a jam-nut $j'$.

The main body of each screw $j$ is provided with a thread $j^2$, which constitutes a rack or worm that is adapted to engage a worm-wheel $f'$, fitted on screw $f$. The free ends of the worms find a bearing in a perforated flange $e^3$ of collar $e$.

The operation of the clutch will be readily understood. When the sleeve $i$ is moved toward the right, (from the position shown in Fig. 2,) the screws $f$ will be so turned by means of the worms $j^2$ and worm-wheels $f'$ that the jaws $g$ $h$ will open and release the flanges $c^2$ $d'$, so that the wheel $b$ is uncoupled. When the sleeve is moved toward the left, the jaws will close upon the flanges and couple the wheel $b$ to the shaft $a$. In order to adjust the play of the jaws $g$ $h$ or, in other words, to set the clutch to flanges $c^2$ $d'$ of different thicknesses, it is only necessary to loosen the nuts $j'$ and screw the worms $j$ $j^2$ farther into or out of the flange $i^2$. In this way the operative length of each worm will be changed, and thus a different amount of rotation will be imparted to worm-wheels $f'$ by the sliding movement of sleeve $i$.

What I claim is—

1. In a clutch, the combination of a shaft with a transmission-wheel, a casing secured to the wheel, a pair of circular flanges on the casing that face each other, jaws engaging both of said flanges, right-and-left screws engaging the jaws, worm-wheels on the screws, worms engaging the worm-wheels, a sliding sleeve carrying the worms and means for axially adjusting the worms on the sleeve, substantially as specified.

2. In a clutch, the combination of a shaft with a sliding sleeve, longitudinally-adjustable worms having threaded ends tapped into said sleeve, right-and-left screws having wheels adapted to be engaged by the worms, jaws carried by the screws, a flange adapted to be engaged by the jaws, and a transmission-wheel operatively connected to the flange, substantially as specified.

Signed by me at New York city, county and State of New York, this 12th day of November, 1900.

JOHN CARLSON.

Witnesses:
BENNET J. MALMFELT,
JOHN B. WETHERBEE.